UNITED STATES PATENT OFFICE.

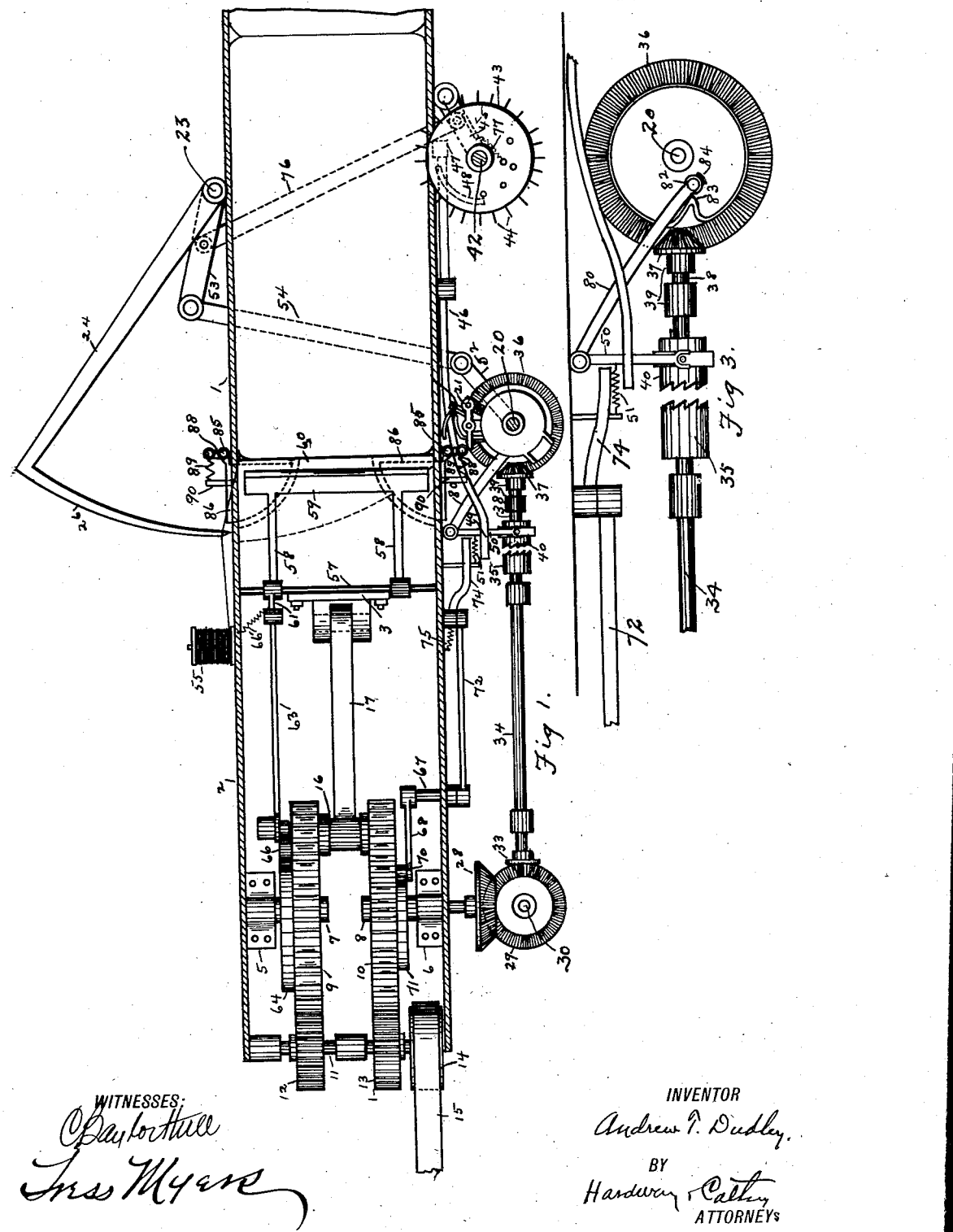

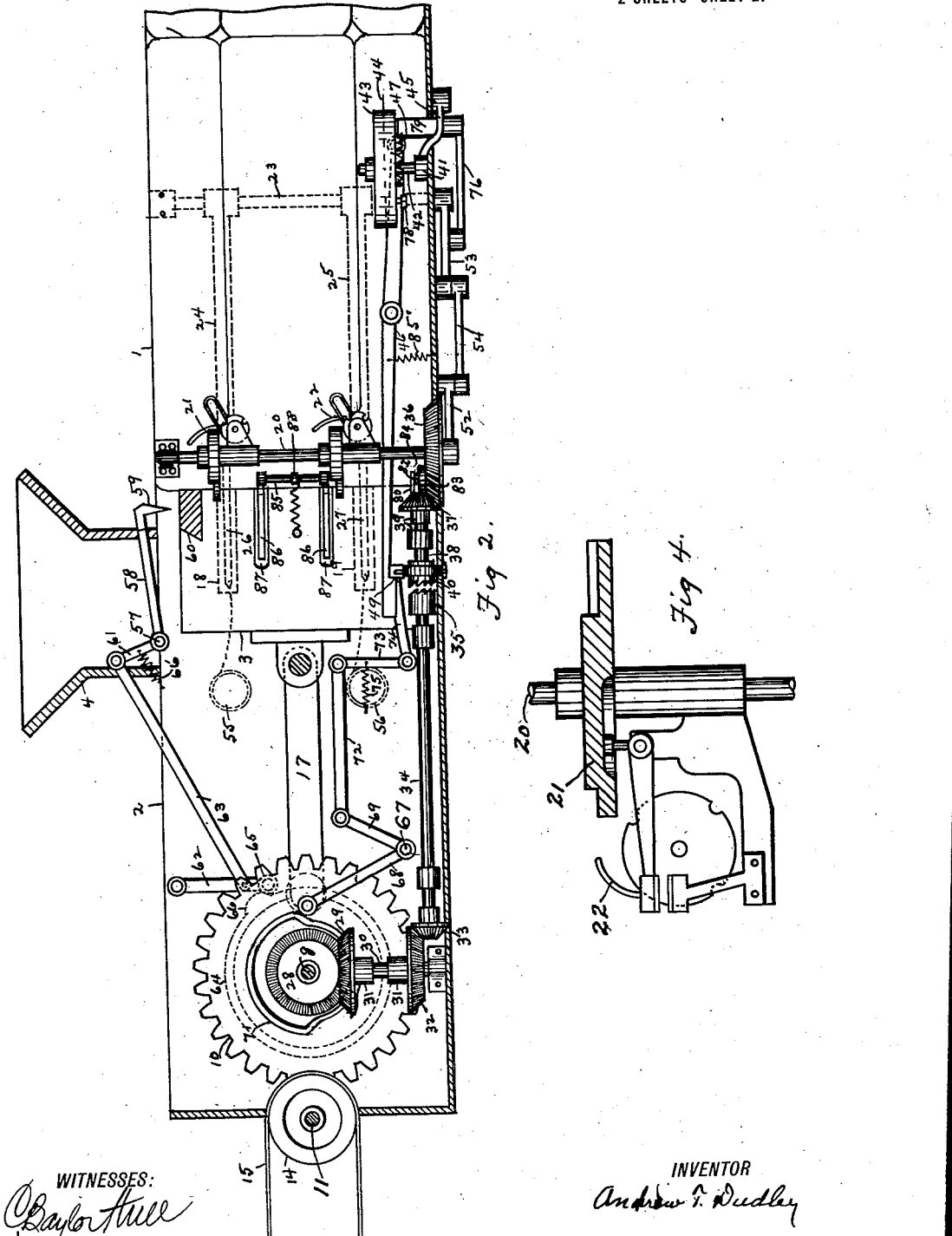

ANDREW T. DUDLEY, OF HOUSTON, TEXAS, ASSIGNOR OF ONE-TENTH TO W. L. MITCHELL, J. H. MITCHELL, AND H. E. WERNER, ALL OF HOUSTON, TEXAS.

HAY-PRESS.

1,205,980.  Specification of Letters Patent.  Patented Nov. 28, 1916.

Application filed January 31, 1913. Serial No. 745,401.

*To all whom it may concern:*

Be it known that I, ANDREW T. DUDLEY, a citizen of the United States, residing at Houston, in the county of Harris and State of Texas, have invented certain new and useful Improvements in Hay - Presses, of which the following is a specification.

My invention relates to new and useful improvements in hay-presses, and has more particular relation to a hay-press or hay-baler, provided with a mechanism whereby the baling wire or cord may be automatically passed around the bale and tied.

The object of the invention is to provide a device of the character described, equipped with this automatic tying mechanism referred to.

Another object of the device resides in the provision of means for automatically regulating the size of the bale to be formed.

A further feature of the invention consists of a mechanism which will automatically determine the time when the tying mechanism is set into operation, and thus prevent said tying mechanism from being set in motion at the wrong time.

A further feature of the invention consists of a means for automatically and completely separating the bales and preventing the bales from being tied or bound together by means of the hay which might otherwise be bound partly in one bale and partly in another.

With the above and other objects in view the invention has particular relation to certain novel features of construction, operation and arrangement of parts, an example of which is given in this specification and illustrated in the accompanying drawings, wherein:—

Figure 1 is a plan view of a hay-press shown partially in section and showing my improvements as a part thereof. Fig. 2 is a side elevation thereof, shown partially in section. Fig. 3 shows a side elevation of the clutch, showing also its operative connections, and Fig. 4 shows a side elevation of the knotter mechanism partially in section.

Referring now more particularly to the drawings, wherein like numerals of reference designate similar parts in each of the figures, the numeral 1 refers to the baling chamber of the device in which the bale is formed, and the numeral 2 refers to a supporting frame-work which is connected to said chamber, and which supports a part of the operative mechanism of the press. A plunger 3 is mounted in the feed end of the baling chamber, and is arranged to reciprocate back and forth and compress the hay fed into said chamber through the hopper 4, into a compact bale. Rotatably mounted in suitable bearings 5 and 6, carried by the frame work 2, are the respective shafts 7 and 8, which, respectively, have rigidly mounted spur gear wheels 9 and 10. Also rotatably mounted in suitable bearings carried by the frame-work 2 is a transverse drive shaft 11 which carries rigidly mounted spur gear wheels 12 and 13 which mesh with the respective gear wheels 9 and 10 and rotate the same. Rotation is imparted to the shaft 11 and the gear wheels 12 and 13 through a pulley wheel 14, rigidly mounted on the shaft 11. This pulley wheel is rotated through a belt 15 by a suitable motor, not shown. The gear wheels 9 and 10 are alined with each other laterally spaced apart a suitable distance, and a wrist 16 positioned eccentric with respect to the said wheels, connects said wheels. A plunger rod 17 is provided, which is pivoted at one end to said wrist 16 and at the other to the back side of the plunger 3, and by the rotation of the said gear wheels 9 and 10 a reciprocating motion is imparted to the plunger through the plunger rod 17, and the wheels 9 and 10 are of a sufficient diameter so that on the back stroke the front end of the plunger will be made to clear the hopper 4, so that the hay to be compressed may be fed through said hopper in front of said plunger, and by the forward stroke said hay, so fed in, will be driven forward into the compress chamber 1. The plunger 3 has a plurality, preferably two, of narrow transverse slots 18 and 19, which extend from side to side thereof, and from about the middle portion entirely to the forward end of the plunger, for a purpose to be hereinafter set forth. Rotatably mounted upon one side of the compress chamber is a vertical knotter shaft 20, which carries and operates the knotters 21 and 22 alined, respectively, with the slots 18 and 19. These knotters are of substantially the character now in use in the ordinary binders for grain, and a specific description thereof is not deemed necessary, inasmuch as their construction and operation is well known.

Rotatably mounted in suitable bearings upon the opposite side of the compress chamber from the shaft 20 and about the longitudinal center of said chamber is the vertical needle shaft 23, which carries the needle arms 24 and 25. The free ends of these arms carry the tying needles numbered, respectively, 26 and 27, which are in alinement with the respective slots 18 and 19, and which are arranged to oscillate back and forth through said slots, in the manner and for the purpose to be hereinafter set forth. The shaft 8 carries on its outer end a rigidly mounted, bevel gear wheel 28, which meshes with a similar gear wheel 29, rigidly mounted upon the vertical shaft 30, rotatable in the bearing 31, carried by the frame 2. Also mounted upon the shaft 30 is a bevel gear wheel 32, which meshes with a similar wheel 33, carried by one end of the shaft 34, supported in any suitable manner and extending lengthwise along the side of the press. The forward end of the shaft 34 has a rigidly mounted clutch member 35, the purpose of which will presently be set forth. The lower end of the vertical shaft 20 carries a rigidly mounted bevel gear wheel 36, which meshes with a similar bevel gear wheel 37, rigidly mounted on the shaft 38, which is rotatable in the bearings 39, 39. The rear end of the shaft 38 carries a slidably mounted clutch member 40, keyed thereon, for a purpose to be hereinafter stated.

Rotatably mounted in the bearing 41, carried by the free end of a swinging arm 45, is a vertical shaft 42, rigidly mounted upon which is an idler wheel 43, whose periphery carries outwardly projecting spikes 44, and these spikes normally engage in the hay of the forming bale, and as the bale, in the process of formation, gradually moves along toward the discharge end of the compress chamber, the wheel 43 is turned thereby. The other end of the arm 45 is pivoted to said chamber so that the wheel 43 may be swung around and its spikes 44 be disengaged from the bale. Pivoted near its central portion to the side of the compress chamber is a lever 46, and one end of this lever extends underneath the wheel 43, and has a laterally projecting roller 47. The under side of the wheel 43 has an elongated arcuate cam 48, in the path of which the roller 47 projects, and when said cam comes in contact with said roller it depresses the corresponding end of the lever 46 and elevates the opposite end thereof. The last mentioned end of the lever 46 has a hook or shoulder 49, which normally engages over the arm 50, and holds the same against the tension of the spring 51, one end of which is attached to the frame 1 and the other end to the arm 50. When the roller 47 is in contact with the cam 48, the opposing end of arm 46 is elevated, and the hook 49 is released from the arm 50, which is thereby released to the pull of spring 51. The outer end of arm 50 is bifurcated, and its fingers are pivoted to the clutch member 40, and as the free end of the arm 50 is pulled back, it carries clutch member 40 into engagement with clutch member 35, and the shafts 34 and 38 are forced to rotate together. The arm 50 is pivoted to the side of the compress chamber 1. The contacting faces of clutch members 35 and 40 have oppositely inclined rack teeth, which interlock, when the members are clutched, and cause simultaneous rotation thereof.

As before stated, the forming bale passing along toward the discharge end of the press causes the rotation of the wheel 43, by reason of the engagement of the spikes 44 with said bale, and the forward end of the cam 48 is so positioned as to contact with the roller 47 and depress the corresponding end of the lever 46, when a sufficient quantity of hay has been forced into the compress chamber by the plunger 3, to form a bale, and as said end of said lever is depressed the opposite end is elevated, which releases the shoulder 49 from the arm 50, and disengages it therefrom, whereupon the pull exerted by the spring 51 operates to carry the clutch member 40 into engagement with the clutch member 35, and the shafts 34 and 38 are thus forced to rotate in unison, and the knotter shaft 20 set in motion through the mechanism operatively connecting said clutch member 40 with said shaft 20. The lower end of the shaft 20 carries a rigidly mounted arm 52, and the needle shaft 23 has a rigidly mounted arm 53, and the free ends of these arms are connected by a cross link 54, and when the shaft 20 begins to rotate, the arm 52 exerts a pull upon the link 54, which is transmitted through said link to the free end of the arm 53, and the needle shaft 23 is forced to perform a partial rotation and swing the free ends of the arms 24 and 25 around toward the compress chamber, and drive the needles 26 and 27 through the respective slots 18 and 19, in the plunger 3, and into operative connection with the corresponding knotters 21 and 22. The sides of the compress chamber also have slots alined with the slots 18 and 19 to permit the passage of the needle therethrough.

The wire used for baling is wound on spools 55 and 56 which are mounted on the opposite side of the frame-work 1 from the knotters, and the free ends of the wire wound on these spools pass through eyes in the respective needle ends, and then across the compress chamber in front of the plunger 3, and are secured to the respective knotters 21 and 22. As the bale is formed, the hay is compressed against the wires which gradually unwind from the spools and embrace the outer end and sides of the bale, and the wire is then carried around the inner end of the bale by the needles as they pass through the slots 18 and 19, and is tied therearound by the knotters 21 and 22, and the bale is then complete and ready to be discharged from the press. When the bale is completed, however, a certain amount of loose hay which has just been fed in through the hopper and whose free ends project back above the plunger may be tied in with the bale at one end, and the other ends thereof may become engaged in and form a part of the next succeeding bale. It is therefore necessary to provide a means for cutting said loose hay and entirely separating the bales. For this purpose I have provided a cutter, the description and operation of which will now be described.

A transverse shaft 57 is rotatably mounted above the frame 1 in bearings carried thereby, and this shaft has two forwardly extending arms 58, 58, whose free ends carry the transverse blade 59, the edge of which projects downwardly, and arranged across the top of the plunger 3 is a wooden cutter block 60, upon which any loose hay which may not be completely compressed into the finished bale will lie. Projecting upwardly from the shaft 57 is an arm 61, and depending downwardly from the frame 1 is a swinging arm 62 whose upper end is pivoted to said frame, and attached to the free end of the arm 61 at one end, and pivoted to the swinging arm 62 at its other end is a link 63. The outer side of the gear wheel 9 carries an outwardly extending rim 64, which is circular in shape and concentric with said gear wheel, and the lower end of the swinging arm 62 has a laterally extending roller 65 which normally rests against the periphery of this rim 64. This rim, at one point in its periphery, has a cam section 66, so arranged as to contact with the roller 65 while the plunger is in its forward position. This cam 66 imparts a forward thrust to the arm 62, which is transmitted to the arm 61 through the link 63, and which causes a sudden partial rotation of the shaft 57, and a sudden downward stroke of the blade 59 onto the block 60, causing said blade to cut each feed of hay forming the bale apart thus permitting the bale to be more easily taken apart, and also entirely separating the bales. After the cam 66 has passed the roller 65 the arm 61 is pulled back into its original position, and the blade 59 elevated by means of a pull spring 66', one end of which is attached to the arm 61 and the other end of which is attached to the frame 1.

Rotatably mounted in a suitable bearing in the side of the frame-work 1 is a short transverse shaft 67, the inner end of which has an upwardly extending arm 68 rigid therewith, and whose outer end has a shorter upwardly extending arm 69, rigidly secured thereto. The upper end of the arm 68 has a laterally extending roller 70, which rests against an eccentric cam-shaped rim 71, carried by the outer side of the gear wheel 10. The upper end of the arm 69 is pivoted to one end of a lengthwise extending link 72, whose other end is pivoted to the upper end of the arm 73. The lower end of this arm 73 is pivoted to the side of the frame 1, and rigid with said lower end and extending forwardly, is an arm 74, whose forward end is free. A pull spring 75, attached at one end to the arm 73 and at its other end to the frame-work normally holds this arm in its rearward position, and the free end of the arm 74 elevated, when not under the influence of the cam-shaped ring 71.

It is obvious that the plunger 3 will not at all times be in its forward position when the cam 48 releases the shoulder 49 from the arm 50, and when in said position it is necessary to suspend the movement of the needle operative mechanism while the plunger is completing its forward stroke, otherwise the needles would force the baling wire through the hay of the incomplete bale. The cam-shaped ring 71 is so positioned as to rest against the roller 70 and hold the arms 68 and 69 in their forward position, which will operate, through links 72 and arm 73 to lower the free end of the arm 74 into the path of the arm 50 while the plunger 3 is performing its forward stroke, but just before the plunger completes its forward stroke the cam 71 releases the roller 70, and the rearward pull of the spring 75 elevates the free end of the arm 74 and carries it out of alinement with the arm 50. The arm 50 will thus be released to the pull of spring 51, in case the bale has been completed, and the shoulder 49 previously released from the arm 50. If the shoulder 49 should be released from the arm 50 too soon, or before the plunger is ready to complete its forward stroke, said arm 50 will engage against the free end of arm 74 and the clutch members 40 and 35 will be held apart until the bale is ready to tie. The cam 71 is so positioned as to release the roller 70 and allow the free end of arm 74 to be elevated out of the path of the arm 50 just before the plunger completes its forward stroke.

A link 76 is pivoted at its respective ends to the arms 45 and 53, and as the arms 24 and 25 swing around to carry the needles into coöperation with the knotters, the arm 53 imparts a thrust to the arm 45 through the link 76 and said arm 45 is forced to swing around and carries the spikes 44 out of engagement with the hay. A pull spring 77 is attached at one end to arm 45 and at the other to the wheel 43, which then restores said wheel to its original position preparatory to the beginning of a new bale. This backward turn of wheel 43 is limited by a movable pin 78, which engages against the shoulder 79, carried by the arm 45, and stops the backward turn of the wheel. This pin may be secured at any desired point on said wheel 43, and the amount of backward turn predetermined, and the size of the bale thus determined. It is obvious that the less backward turn the wheel is permitted to have the sooner the cam 48 will trip the lever 46, and the shorter will be the bale, and vice versa.

In order to detach the shaft 38 from its driving shaft I have provided a lever 80 which is rigid with arm 50, and whose free end projects out over the upper face of gear wheel 36 and whose free end carries a roller 82. The upper face of said gear wheel carries a cam 83 so positioned as to contact with said roller just after the bale has been tied and the needles withdrawn from across the compress chamber. This cam forces the free end of lever 80 inwardly, which imparts a corresponding motion to the outer end of arm 50 and carries the clutch member 40 out of engagement with the clutch member 35, and the needle and knotter mechanisms are declutched from their driving means. In order to stop these mechanisms positively, a bumper 84 is projected from the upper face of the gear wheel, and so positioned as to engage against the roller 82, as the clutch is disengaged, and positively stop the needle and knotter mechanism from continuing to operate from momentum. When the arm 50 is forced back to its original position, the shoulder 49 is pulled down by the pull of spring 85', attached thereto, and also to the compress wall, and again engages over the arm 50 and holds the same until another bale has been completed. When the shoulder 49 is again disengaged from the arm 50 the roller 82 drops between the joint of cam 83 and the bumper 84 and the gear wheel 36 is again free to perform another revolution in tying the next succeeding bale.

On each side of the compression chamber 1, I have mounted in suitable bearings short, vertical shafts 85, 85, slightly in front of the plunger 3 when in its forward position. Each of the shafts 85, 85 carries at its upper and lower extremities, respectively, dogs 86, 86, which are rigidly mounted thereon. The sides of the dogs facing the plunger chamber are sloping, so that as the hay is forced forward by said plunger it will be crowded between said dogs and they will be forced outwardly, moving through the slots 87, 87 in the sides of the compress chamber 1. Each of the shafts 85, 85, has an arm 88, projecting outwardly therefrom and rigid therewith, and to the free end of each arm 88, is attached a pull spring 89, said springs also being attached to projections 90 90, extending outwardly from the compress chamber. When the plunger has reached the limit of its forward stroke the pull of the springs 89, 89 causes a rotation of the shafts 85, 85, which forces the dogs 86, 86 inwardly through the slots on each side of the plunger 3, and as the plunger moves back the abrupt shoulders on the sides of the dogs next to the forming bale engage the hay compressed and retain the compression thereof.

What I claim is:—

1. A device of the character described, including a compress chamber, a plunger arranged to reciprocate therein, a plunger operative mechanism, a needle operative mechanism and a needle carried thereby and arranged to swing laterally back and forth across the compress chamber and carrying a tying cord around the bale therein, a knotter alined with said needle and arranged to coact therewith and knot the tying cord around the bale, a knotter operative mechanism, means operatively connected with the knotter operative mechanism and also with the needle operative mechanism, and causing the former to operate the latter, a means at predetermined intervals connecting the plunger operating mechanism with the knotter operative mechanism, a mechanism fixing the time of said connection, and being in turn controlled by the plunger operative mechanism.

2. A device of the character described, including a compress chamber, a plunger arranged to reciprocate therein, a mechanism, operatively connected with the plunger and imparting a reciprocating movement thereto, a needle operative mechanism and a needle carried thereby and arranged to move back and forth across the compress chamber and carry a tying cord around the bale formed therein, a knotter arranged to co-act with the needle and knot said tying cord around said bale, a mechanism for operating the knotter, means operatively connected with the knotter mechanism, and also with the needle operative mechanism, and transmitting movement from the former to the latter, a means for operatively connecting the plunger operative mechanism and knotter operative mechanism, a mechanism moving in unison with the bale forming in the compress chamber, and automatically releasing said connecting means and thereby connecting the plunger operating mechanism with the knotter operative mechanism, and means controlled by the knotter operative mechanism for disconnecting the same.

3. A device of the character described, including a compress chamber, a plunger arranged to reciprocate therein, whose forward end is provided with a plurality of transverse slots, a mechanism operatively connected with the plunger and imparting a reciprocating movement thereto, a needle operative mechanism, a plurality of laterally swinging needles operated thereby and arranged to move back and forth across the compress chamber and pass through the corresponding slots of the plunger and carry tying cords around the bale forming in said chamber, a plurality of knotters, one for each needle each knotter being arranged to co-act with its corresponding needle and knot the tying cord carried by said needle around said bale, a mechanism for operating the knotters, means operatively connected with the knotter operative mechanism, and also with the needle operative mechanism and operating the latter from the former, a clutch whereby the plunger operative mechanism may be connected with and disconnected from the knotter operative mechanism, a means for operatively engaging the clutch, a means operated by the bale as it moves along in the compress chamber and normally holding said clutch engaging means in locked position but which at predetermined intervals releases said engaging means, thereby controlling said clutch, and causes the connection of the plunger operative mechanism with the knotter operative mechanism, and means for predetermining the time of said connection.

4. A device of the character described including a compress chamber, having a feed inlet leading thereto, a plunger arranged to reciprocate in the chamber and compress the material fed through said inlet into said chamber into a bale, the forward end of said plunger being provided with a plurality of transverse slots, a mechanism operatively connected with the plunger and imparting a reciprocating movement thereto, a needle operative mechanism, a plurality of laterally swinging needles operated thereby and arranged to move back and forth through the compress chamber and pass through the corresponding slots of the plunger and carry tying cords around the bales formed in said chamber, a securing mechanism for each needle being arranged to co-act therewith and secure the tying cord carried by said needle around said bale, a means for operating said securing mechanism, means operatively connected with said last mentioned means, and also with the needle operative mechanism, and operating the latter from the former, a clutch whereby the plunger operative mechanism may be connected with and disconnected from the mechanism which operates said securing means, and means operated by the bale as it moves along in the compress chamber for controlling said clutch, and connecting the plunger operating mechanism with the mechanism which operates said securing means, and a means controlled by the plunger operating mechanism by which the time of the connection of the plunger operating mechanism and the mechanism which operates said securing means is predetermined.

5. A device of the character described including a compression chamber in which material is compressed into a bale, a mechanism for compressing said material in said chamber, a binding mechanism, a drive shaft, a mechanism for operatively connecting said drive shaft and binding mechanism, a means for locking said connecting mechanism against movement, a means for releasing said locking means and permitting said connecting mechanism to operatively connect the drive shaft and binding mechanism, a means controlled by the compressing mechanism, and at predetermined times engaging with the connecting mechanism after the locking means have been released and fixing the time of the connection of said binding mechanism with said drive shaft.

6. In a device of the character described, the combination with a compressing chamber, and a plunger which reciprocates back and forth therein, of a binding mechanism, a drive shaft, a mechanism for operatively connecting said shaft and binding mechanism, a means for locking said connecting mechanism against movement, a means controlled by the bale moving in said chamber, for releasing said locking means, means controlled by the plunger operative mechanism, and at predetermined intervals permitting said connecting mechanism to operatively connect the drive shaft and binding mechanism when the plunger is in its forward position, and means automatically disconnecting said binding mechanism from said drive shaft.

7. A device of the character described including a compressing chamber in which material is compressed into a bale, a mechanism embodying a plunger for compressing said material in said chamber, a binding mechanism, a drive shaft, a mechanism for operatively connecting said shaft and binding mechanism, a means for locking said connecting mechanism against movement, a means controlled by the compressed material for releasing said locking means at predetermined intervals and permitting said connecting mechanism to operatively connect the drive shaft and binding mechanism, and means engaging at predetermined times with the connecting mechanism, after the locking means have been released and fixing the connection of said binding mechanism with said drive shaft at a time when the plunger is in its forward position.

In testimony whereof I have signed my name to this specification in the presence of two subscribing witnesses.

ANDREW T. DUDLEY.

Witnesses:
J. W. YEAGLEY,
B. L. TAYLOR.